Nov. 28, 1967     D. B. BADGLEY     3,355,375
APPARATUS FOR ELECTROPHORETIC FRACTIONATION OF AMPHOLYTES
Filed Oct. 9, 1962     5 Sheets-Sheet 1

INVENTOR.
Durward B. Badgley
By Atty R.S. Story

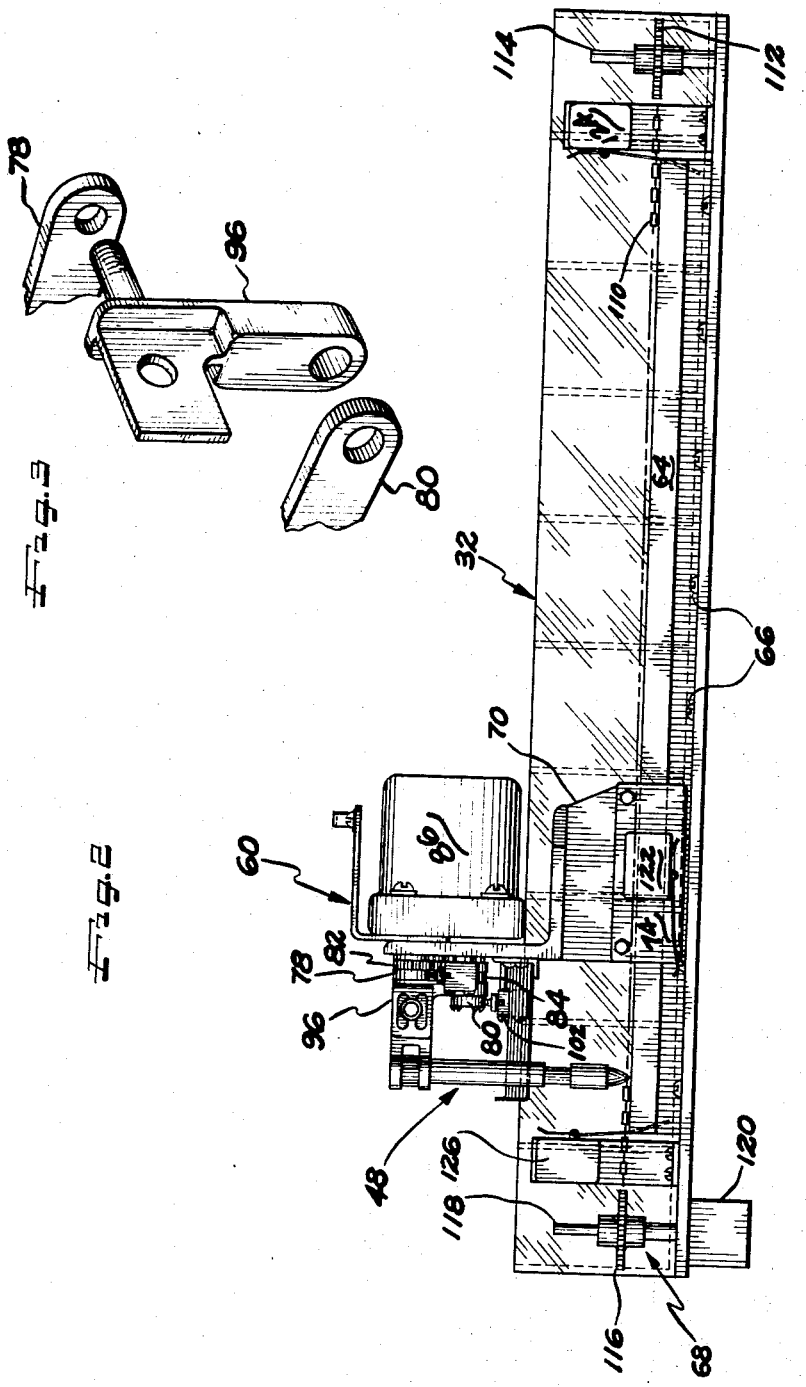

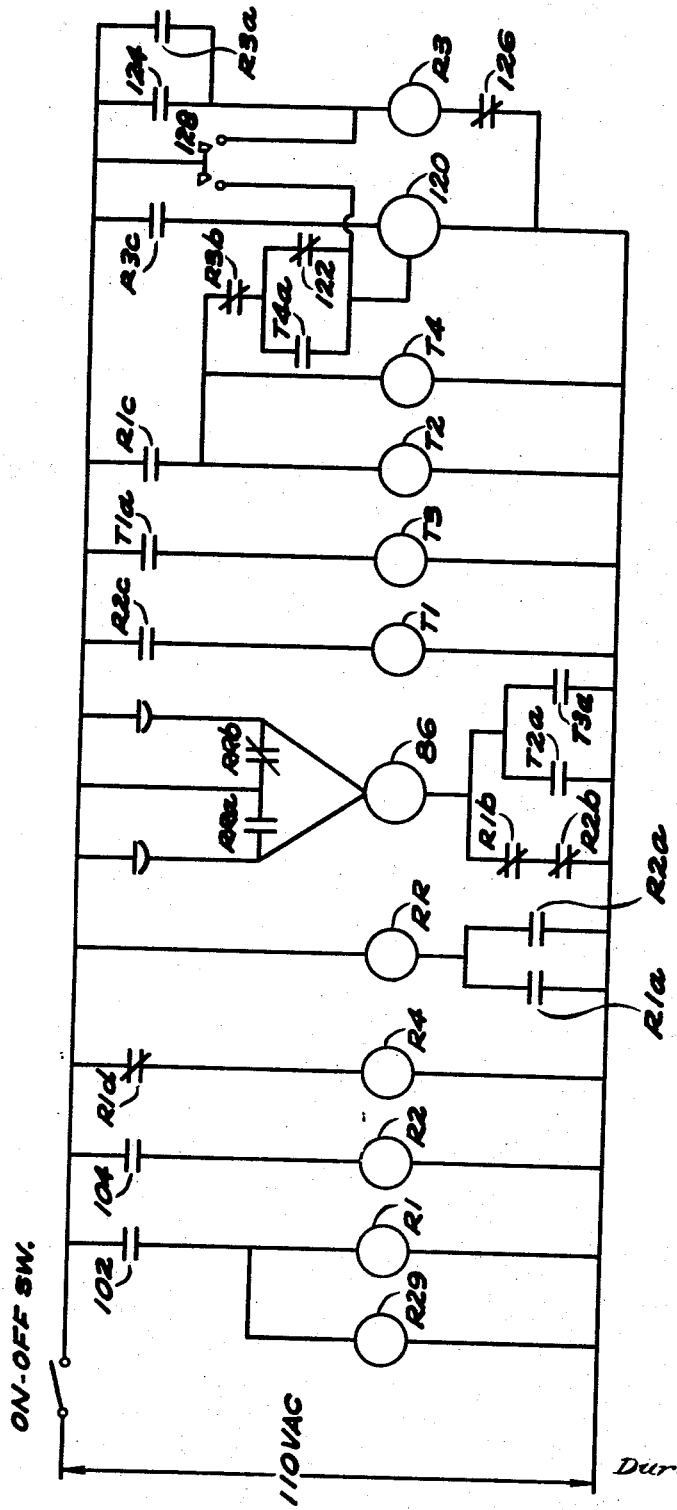

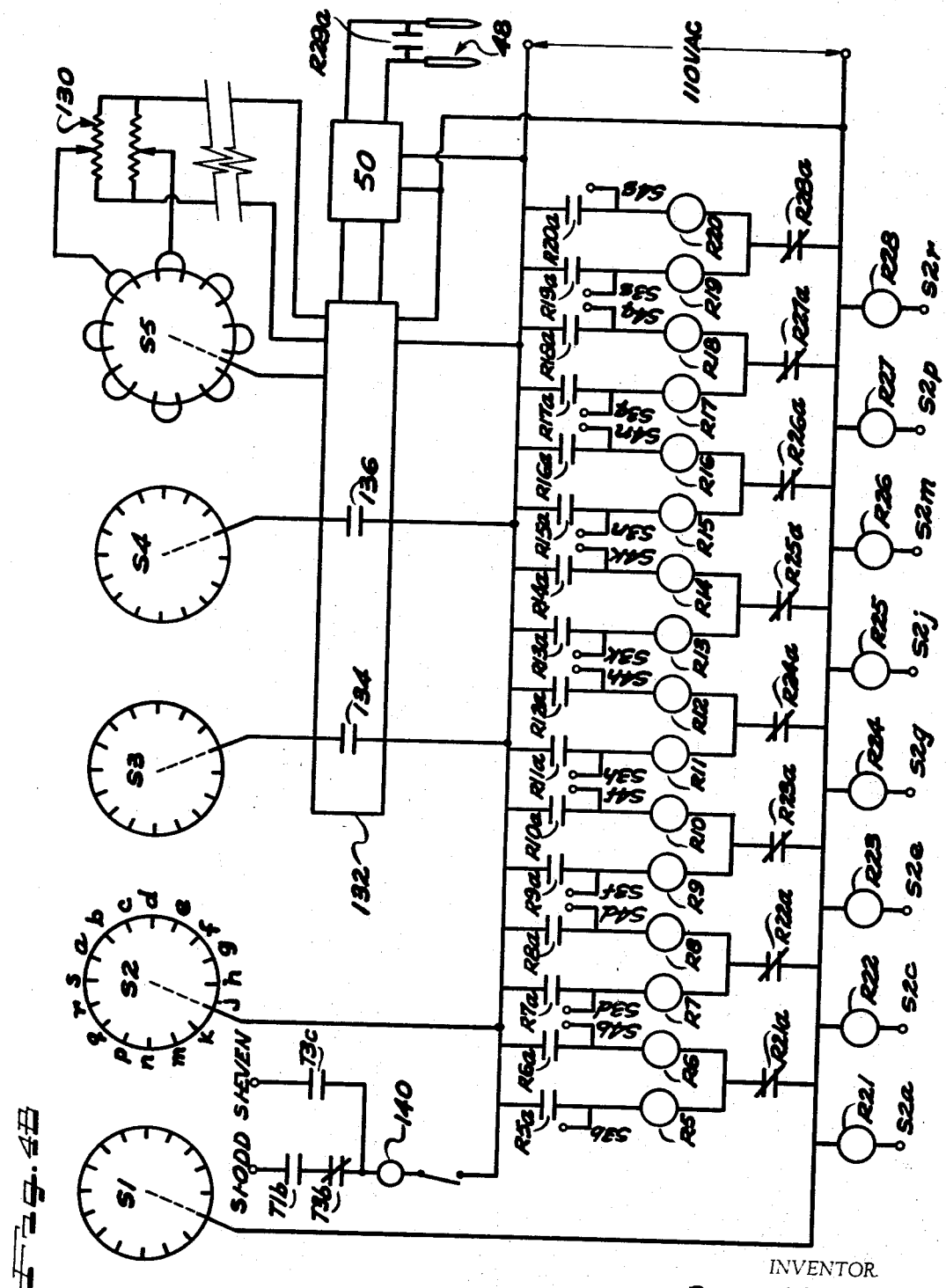

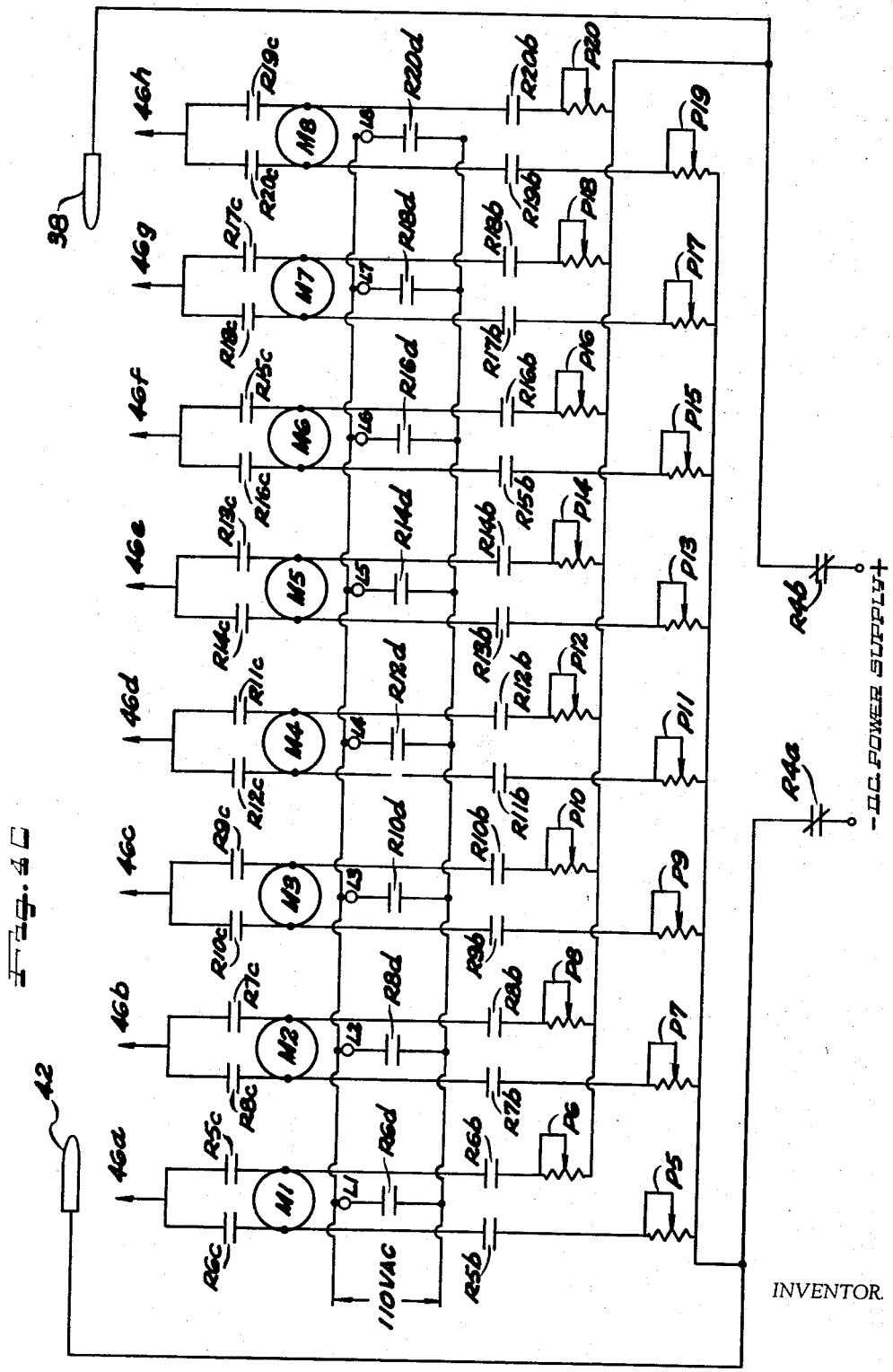

United States Patent Office 3,355,375
Patented Nov. 28, 1967

3,355,375
APPARATUS FOR ELECTROPHORETIC
FRACTIONATION OF AMPHOLYTES
Durward B. Badgley, Chicago, Ill., assignor to Swift & Company, Chicago, Ill., a corporation of Illinois
Filed Oct. 9, 1962, Ser. No. 229,442
9 Claims. (Cl. 204—299)

This invention relates to method and apparatus for concentrating and fractionating ampholytes from solutions containing ampholytes.

Amphoteric materials are often found as mixtures of individual amphoteric substances. Fractionation of such mixtures is desirable where reasonably pure substances are required or where the individual components making up a mixture are to be identified. One manner in which this may be accomplished is by electrophoretic fractionation wherein a liquid solution of such materials is introduced into a series of fractionating zones, separated by membranes or other amphoteric permeable members, and an electric potential impressed across the solution.

The amphoteric materials are made up of charged molecules characterized by isoelectric points or pH values at which they are neutral. An electric potential impressed across a solution of amphoteric materials will establish a pH gradient and the zones may be maintained at various hydrogen ion concentrations. The amphoteric substances will tend to migrate toward a positive or negative potential and will cease migration upon reaching a region where they have no relative charge. Migration of the ampholytes, however, causes infinitesimal changes in the pH in each of the zones of the pH gradient, and the respective pH values in the various zones and cells must be maintained at a substantially constant value by means of electrotitration if one or more of the various substances are to be collected.

Electrophoretic fractionation is useful in the separation of proteins such as enzymes from solutions of such materials. A method and apparatus for conducting such separation by electrolytic fractionation is disclosed in a copending application S.N. 130,051, now abandoned, filed Aug. 8, 1961, by Thomas H. Donnelly. That application discloses a system comprising a plurality of zones or cells positioned between an anode and cathode chamber. Means are provided for the introduction and withdrawal of liquid material, and agitating means is provided in each of the cells and chambers to maintain the characteristics of the liquid uniform throughout such cells. Also in that system, an electrotitrating means is present in each cell for impressing a relatively positive or negative secondary potential therein to adjust the pH level in accordance with deviations from the desired pH gradient detected by pH sensing means permanently located in each cell.

This system, however, has the disadvantage that it requires separate pH sensing means in each fractionating cell, and thus, is expensive. Additionally, that system involves a further disadvantage in that the pH sensing means continuously remains in the liquid being tested and regulated, and thus is subject to error where the liquid environment immediately adjacent such sensing means may not undergo the same change as the remaining liquid in a cell. It is necessary to keep in mind, in this regard, that very small changes in pH values are involved.

Accordingly, it is an object of this invention to provide an improved electrophoretic fractionating method and apparatus wherein the pH sensing means is removed from the fractionating cell and rinsed between pH determinations.

It is a further object of this invention to provide an improved electrophoretic fractionating method and apparatus whereby the pH level in a plurality of fractionating cells may be tested and maintained with a lesser number of pH sensing means.

It is still another object of this invention to provide an improved electrophoretic fractionating method and apparatus wherein a single pH sensing means may be used to test and regulate the pH level in a plurality of fractionating cells.

Basically, my invention comprises the impressing of an electric potential across a series of zones containing an ampholytic solution to establish a pH gradient in said zones. Each zone is automatically adjusted to a desired pH value by electrotitration in accordance with the actual pH level detected at intervals by a single pH sensing means. Each zone is tested in sequence for the actual pH level; and the pH sensing means is rinsed before testing each zone.

An apparatus devised for carrying out this method comprises a bank of fractionating cells, in series, and a rinse tank spaced parallel thereto. A pH sensing means is mounted upon a movable means for traveling between the rinse tank and cell bank and parallel to the latter. The movable means is sequentially positioned adjacent each cell and the pH sensing means is moved from the rinse tank into the cell. The pH level is then measured and the sensing means is returned to the rinse tank whereafter the movable means is positioned adjacent the next cell in series and the sequence repeated.

My invention also includes an improved electrical control system, including anode and cathode means for impressing a potential on the bank of cells, and an electrotitrating means in each cell for adjusting the pH level therein. The single traveling pH sensing means is electrically connectable with a control means which is preset for a desired pH value in each cell. Upon the pH sensing means entering a given cell, it is electrically connected to an appropriate portion of the control means and, if the pH level differs from the desired value, an appropriate positive or negative potential is connected to the respective electrotitrating means.

Further objects and advantages of the present invention will be apparent from the following detailed description when taken in conjunction with the drawings wherein:

FIGURE 2 is a side elevation of the apparatus of FIGURE 1 with parts removed;

FIGURE 3 is a partial exploded view of a portion of the apparatus of FIGURE 1; and FIGURES 4A, 4B, and 4C are schematic wiring diagrams of circuits in connection with the apparatus for positioning the pH sensing means, detecting the pH level, and adjusting the pH value, respectively.

Figure 1:
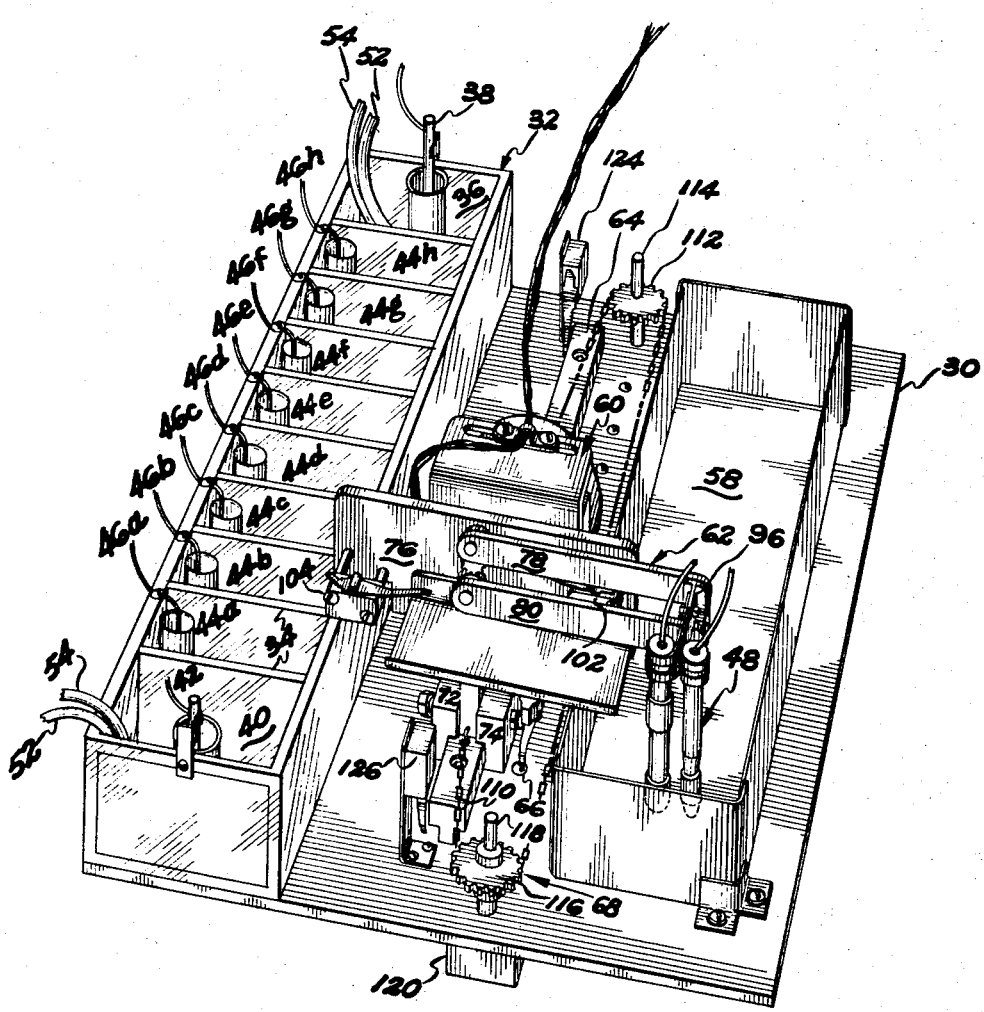
FIGURE 1 is a perspective view of the present apparatus.

In practicing the method of my invention a solution of ampholytic materials is introduced into a series of zones and a potential of from about 10 to 600 volts, producing a direct current of about 10 to 500 milliamps, is impressed across the zones. Additional solution may be added continuously, or at intervals, at one or more of the zones, and like amounts of used solution may be similarly discharged. The liquid is preferably continuously agitated within each zone, and the pH level in each zone is periodically measured.

While the ampholytes are under the influence of the electric potential the amphoteric solutes are conducted through the zones maintained at various hydrogen ion concentrations in a pH gradient. As the solution is passed through the pH gradient, the relative charge on the ampholytes changes and an individual ampholyte ceases migrating upon reaching a region where it has no relative charge. The movement of ampholytes into and through the various zones causes an infinitesimal change in pH in each of the zones and the pH of the zones is automatically maintained at a constant value by means of electrotitration undertaken where the measured pH level differs from the desired gradient. In this manner, various complex mixtures of ampholytic materials such as enzymes, hormones, serum proteins, and animal and vegetable peptides and proteins generally can be fractionated into more or less pure aliquots.

The detection of actual pH levels in each of the zones is accomplished in sequential order by a pH sensing means which is alternately introduced into one zone and then rinsed in pure water before being introduced into the next adjacent zone.

Each zone is tested for pH level, in order, and the cycle continuously repeated from the first to the last zone in a given direction. Before introducing the pH sensing means into any zone it is desirable to disconnect the electric potential across the zones so as not to affect the pH reading. The sensing means is then allowed to come to equilibrium (requiring approximately 10 seconds) and the pH level of the zone is then measured. This data is introduced into a control circuit and the measured pH level is compared with the desired pH value for that zone. If the comparison requires that the pH level in the zone be driven to a higher value, a small positive potential is made available to an electrotitrating wire immersed in the solution within that zone. This potential is desirably of a range that will produce a current of 10–70 milliamps through the wire. If the comparison indicates that the pH should be driven to a lower value, a small negative potential is made available to the electrotitrating wire. If no adjustment is required, no potential is made available.

After detecting the existing pH level, the pH sensing means is withdrawn from the fractionating zone and rinsed in water for a period of 30 to 45 seconds. During the latter time, the electric potential is restored across the series of zones and the pH adjusting potential is applied to the particular zone or zones where required. During the same time, the pH sensing means is moved into alignment with the next adjacent zone in series, and after the rinse is completed it is immersed in the solution of the latter zone. Again, when the sensing means is withdrawn from the rinse tank and before it is immersed in the solution, the electric potential, and any previously applied pH adjusting potentials in preceding zones is temporarily disconnected.

The cycle is then repeated in every fractionating zone and the primary potential and all adjusting pH potentials are applied to the solution only during the periods that the pH sensing means is withdrawn from the solution. The operation may be continuously undertaken and exhausted solution replenished with fresh solution while precipitates may be periodically withdrawn from the respective zones.

The preferred form of apparatus for carrying out this invention is shown in FIGURES 1–4. In FIGURES 1, 2 and 3, the apparatus for manipulating the pH sensing means is illustrated. The preferred apparatus comprises a base 30 upon one side of which is mounted a fractionating cell block generally 32. The cell block 32 is divided into a series of zones or cells by a plurality of divider members 34. The latter members may be constructed of filter paper, permeable membranes, sintered glass or the like. An anode chamber 36 and anode 38 are located at one end of the cell block 32. Similarly, a cathode chamber 40 and cathode 42 are located at the opposite end.

The divider members 34 form a plurality of fractionating cells 44 between the anode and cathode chambers. Each fractionating cell contains an electrotitrating electrode 46a–46h. A total of eight cells are illustrated.

The pH sensing means is shown generally at 48 and comprises glass electrode and calomel reference cells believed to be similar to apparatus shown in the Beckman et al. Patent No. 2,058,761, the disclosure of which is included herein by reference. The pH sensing means generally 48 is considered to include a conventional pH meter 50 such as is also believed to be described in the aforementioned patent, or its equivalent.

One or more pairs of liquid supply tubes 52 and discharge tubes 54 are connected between the cell block 32 and suitable pumps and sources of solution, not shown. Each cell may also be provided with means to agitate the liquid (not shown).

A rinse tank generally 58 is also supported on the base 30 parallel to and spaced apart from the cell block 32. The rinse tank 58 may also be provided with liquid supply and discharge means, not shown.

A carriage means generally 60 is positioned between the cell block 32 and rinse tank 58 and is adapted to reciprocally move parallel thereto. The pH sensing means generally 48 is mounted on a transversely movable carrier means generally 62 supported on the carriage 60 so as to travel both longitudinally and transversely of the cell block and rinse tank. The carriage means generally 60 is slidably supported on a track 64 which is secured to the base 30 between the cell block and rinse tank. A plurality of stops 66 are fastened to the base 30 adjacent track 64 and opposite each cell 44. The carriage generally 60 is intermittently advanced along the track 64 by a drive means generally 68.

The carriage generally 60 comprises an upstanding frame 70, which rests upon the track 64, and a pair of plastic guards 72–74 bolted to its sides which engage the sides of the track. A face plate 76 is secured to one end of the carriage frame 70 perpendicular to the cell block generally 32. The movable carrier means generally 62 is supported thereon. The latter comprises a pair of parallel arms 78, 80 each secured at one end to a pair of spaced gears 82, 84, which mesh with a drive gear. A reversible electric servomotor 86 is mounted behind the face plate 76. The motor shaft extends through the face plate 76 and is secured to the drive gear. Thus, when the motor 86 turns the drive gear both gears 82 and 84 will be turned in the same direction. The lower of the two parallel arms 80 is mounted in advance of the upper arm 78 (as seen in FIGURE 2), and thus the two arms will swing in parallel relation.

A pivotal mounting 96, shown in detail in FIGURE 3, is pivotally mounted between the free ends of arms 78, 80, and the pH sensing means generally 48 is suspended on a lug extending therefrom. Thus the sensing means will always depend from the arms 78, 80 when swung to either the rinse tank 58 or cell block 32 by the movable carrier.

A pair of trip switches 102, 104 are positioned at each side of the face plate 76. As will subsequently be made clear, these switches control the motor 86 so as to limit movement of the parallel arms 78, 80.

The carriage drive means generally 68 preferably consists of a drive chain 110 connected to both ends of the carriage and trained about an idler sprocket 112, mounted upon a stub shaft 114, and a drive sprocket 116, mounted upon a drive shaft 118. The stub shaft is rotatably mounted upon the base 30 whereas the drive shaft 118 extends through the base to a drive motor 120. Motor 120 is preferably of the two-field reversible type. A trip switch 122 is mounted on a side of the carriage means generally 60 in a position to contact the stops 66 and electrically connected to de-energize motor 120 to stop the carriage when the pH sensing means 48 is opposite an appropriate cell 44.

The extent of travel of the carriage means 60 in either direction is controlled by a pair of limit switches 124, 126 positioned adjacent to the ends of the track 64. These switches are electrically connected to the motor 120 so as to reverse the motor field upon the carriage 60 reaching the end of its travel in either direction.

The apparatus is also provided with a manual reverse switch 128 (shown only in FIGURE 4A), so that an operator may override the automatic control during any portion of the operation.

As will become apparent in the following discussion of the control circuit, the preferred apparatus also includes a controller 132, of a type that is available in the commercial market, connected to the pH meter 50 to which the measured pH information is fed. The controller initiates adjustment of the pH in any of the fractionating cells. The controller 132 includes a pair of control switches 134, 136 which, as will become apparent, are respectively closed where the pH is to be driven downwardly by the application of a negative potential or upwardly by the application of a positive potential.

A unique system of electrical control circuits has been devised for operating the foregoing apparatus. These circuits are shown in FIGURES 4A, 4B, and 4C. Throughout the latter figures, a code has been followed to facilitate understanding and permit simplification of the wiring diagrams. The aforementioned electrical components are identified therein by their above noted reference characters. The following tabulation shows the number coding of the remaining elements:

Relays are designated by capital letter R, followed by a number, e.g., R1, R2, etc.

Timers are designated by capital letter T, followed by a number, e.g., T1, T2, etc.

Relay and timer contacts (switches) are designated by a lower case letter preceded by the nomenclature of the relay or timer by which they are actuated, e.g., R1a, R1b, T1a, T1b, etc.

Stepping switch banks are designated by capital S, followed by a numeral, e.g. S1, S2, etc.

Stepping switch contacts are designated by a lower case letter, and connections therewith are identified by a combination of bank and contact nomenclature, e.g., S3a, S3b, etc.

Lamps are indicated by capital letter L.

Ammeters are designated by capital letter M, followed by a number, e.g., M1, M2, etc.

Potentiometers are indicated by the capital letter P, followed by a number, e.g., P5, P6, etc.

The circuits may be best understood by following the operation of the apparatus. The circuit for operating the carriage means generally 60 and movable carrier means generally 68 is shown in FIGURE 4A. It may be seen that the circuit generally comprises a plurality of relays and timers connected in parallel to a source of 110 volt A.C. power. The reversible motor 86 is also connected to the source of power parallel to the relays and timers. In series with each relay, timer and motor is at least one switch to control application of power thereto.

When the pH sensing means 48 is swung to the rinse tank, the movable carrier means 62 will close trip switch 102, energizing relays R1 and R29. The latter relay merely closes normally opened switch R29a to short a connection between the two electrodes of the pH sensing means. (Relay and timer contacts will be referred to as switches herein to avoid confusion with the stepping switch contacts.) Relay R1, however, operates four switches, R1a–R1d. Relay contact switch R1a is connected to energize the coil of a ratchet relay RR which, in turn, reverses the open and closed positions of switches RRa and RRb, respectively, in a reversing circuit for the reversing motor 86. At the same time, switch R1b opens one of three parallel circuits available to energize the motor 86, and switch R1c is closed to energize timers T2 and T4, and make power available to one field winding of carriage motor 120 for movement in one direction. The motor 120 will advance the carriage 60 until normally closed trip switch 122 strikes a stop 66 and breaks the circuit to motor 120. It is to be noted in this regard that when the carriage is at rest with the switch 122 against a stop 66, the switch will be held open. However, the timer T4, when energized, holds switch T4a closed for a period of about 2 seconds to connect the motor 120 to its source of power while the carriage overrides the stop 66. When timer T4 times out, switch T4a is opened and the motor will be energized only until trip switch 122 is opened.

Also while relay R1 is energized, a fourth relay switch R1d, which is normally closed, is opened to de-energize relay R4. The only function of the latter relay is to control the application of potential to the anode, cathode and electrotitrating wires 46a–46h. Normally closed relay switches R4a and R4b (shown in FIGURE 4C) will remain closed only during that period that the relay R4 is de-energized, which is during the period that the pH sensing means 48 remains in the rinse tank. When the sensing means is swung out of the tank, trip switch 102 is opened to de-energize relay R1 and, thus, reclose relay switch R1d energizing the relay R4 and thereby opening switches R4a and R4b to disconnect all power to the electrotitrating wires and the anode 36 and cathode 38. Also, when switch 102 is opened, relay R29 is de-energized opening switch R29a and re-establishing a connection between the pH sensing means 48, pH meter 50 and controller 132.

As has been noted, when the relay R1 is energized, one of the circuits to the reversible motor 86 will be broken at switch R1b. However, the motor may be energized through either of two other circuits controlled by timers T2 and T3, respectively. Timer T2 is energized when the pH sensing means 48 is immersed in the rinse tank by the closing of relay switch R1c. This timer times out after a period sufficient to rinse the pH sensing means, which is preferably about 30 to 45 seconds. Upon timer T2 timing out, a normally open switch T2a is closed, connecting power to the reversible motor 86. Since the ratchet relay RR will previously have adjusted the position of switches RRa and RRb, the motor 86 will run in a direction to swing the parallel arms 78, 80 (and pH sensing means 48) away from trip switch 102, whereby the latter is opened, toward the fractionating cells 44 and trip switch 104.

When the pH sensing means 48 enters one of the fractionating cells 44 in cell block 32, the trip switch 104 will be closed, energizing relay R2. A relay switch R2a is thereby closed to actuate the ratchet relay RR to reverse the position of its switches RRa, RRb and prepare the reversible motor 86 for movement in the opposite direction. At the same time, the relay R2 opens switch R2b which disconnects the motor 86 from power and stops further movement of the arms 78, 80. Relay switch R2c is also closed when relay R2 is energized to, in turn, energize timer T1. The function of timer T1 is to provide sufficient time for the pH electrodes to come to equilibrium before delivering information to the controller 132. A period of approximately 10 seconds has been found sufficient for this purpose.

Upon timer T1 timing out, two timer-actuated switches T1a and T1b are closed (the latter shown in FIGURE 4B). Switch T1a initiates timer T3 which, in effect, controls the period of time that information will be fed from the pH detection circuit to the pH adjusting circuit. The timer switches are subsequently returned to their original or normal positions when the respective timers are de-energized.

Timer switch T1b completes a connection between a spring coil 140 of a stepping switch 142 and a source of power through a first bank S1 of the stepping switch. As will hereinafter be further explained, this steps the switch from its starting or first contact "a" to the next contact "b." At both contacts a connection is made through the last bank S5 between the controller 132 and a set-point potentiometer generally 130, which acts as a reference against which the measured pH level for the first cell being tested is compared. The stepping switch 142 constitutes a switching means for sequentially examining and correcting the pH in each cell.

Upon timer T3 timing out (approximately 4 seconds has been found sufficient to obtain an accurate pH reading), timer switches T3a, T3b, and T3c are actuated. Switch T3a (FIGURE 4A) connects the reversible motor 86 to its source of power so as to turn the arms 78, 80 and withdraw the pH sensing means 48 from the fractionating cell. Switch T3b (FIGURE 4B), which is normally closed in series with switch T1b, breaks the previous connection made to the stepping switch 142 by timer T1 and its switch T1b. Simultaneously, the timer T3 closes its switch T3c (FIGURE 4B), establishing a different connection between the spring coil 140 and its source of power through the stepping switch 142 bank S1. The stepping switch 142 will then move to its next position, disconnecting the set-point potentiometer 130 for the first cell and connecting the next potentiometer to controller 132 for measurement of the next cell at the appropriate time.

The foregoing cycle of movement and operation of the circuit thus described will be repeated as the carriage 60 is moved in steps toward the limit switch 124. When the carriage 60 strikes and closes the limit switch 124, relay R3 is energized to actuate relay switches R3a, R3b, and R3c. Switch R3a is in parallel with switch 124 and, thus, self-holds energized relay R3. It is to be noted that switch 124 is positioned so that the carriage 60 will close it only when the pH sensing means is in the rinse tank 58.

The relay switch R3b, which is normally closed to make power available to the carriage motor 120, is opened so that the motor cannot operate the carriage 60 in the forward direction. Simultaneously, relay switch R3c connects the reverse field winding of the motor 120 to its source of power and the motor will run in its reverse direction, returning the carriage means 60 toward the limit switch 126. The latter position will be reached before the pH sensing means is again swung toward the cell block.

Upon the carriage 60 striking limit switch 126, which is normally closed, the power connection to relay R3 will be broken, reversing the movement of switches R3a, R3b, and R3c, whereby switch R3b is again closed to provided power to the forward field winding of motor 120 and disconnect the reverse field winding. The apparatus is then in position to repeat its cycle of operation.

During the aforementioned operation of the carriage means generally 60 and movable carrier means generally 62, the stepping switch 142 is advanced, as previously described, only during the testing of each cell. In FIGURE 4B, it may be seen that the stepping switch 142 comprises 5 banks S1, S2, S3, S4, and S5. In the preferred apparatus, wherein eight fractionating cells are utilized, each bank of the stepping switch 142 should contain 16 step contacts which are identified in the figures consecutively by reference letters a, b, c, d, e, f, g, h, j, k, m, n, p, q, r, and s. Each consecutive pair of step contacts is utilized in connection with the testing of a given fractionating cell 44.

Bank S1 of the stepping switch is utilized to energize the stepping mechanism upon the timing out of timers T1 and T3, respectively. Bank S2 is utilized, as will be hereinafter explained, to prevent any adjusting potential from being applied to the electrotitrating means 46 while the pH electrodes are being equalized, and to clear the preset circuit for the next subsequent cell to be retested. Banks S3 and S4 are utilized to control the availability of a negative potential or positive potential, respectively, to the electrotitrating means; and bank S5 is utilized to establish the proper reference for the controller 32 when comparing the measured pH level to an established desired pH value.

Since the pH control circuits illustrated in FIGURES 4B and 4C comprise substantially 8 identical portions connected in parallel (one portion representing the control circuit for one fractionating cell) only so much of the circuit for controlling the operation at the first fractionating cell 44 will be described.

When the pH sensing means 48 is immersed in the liquid in any fractionating cell, the stepping switch 142 will be at an odd position. Thus when the pH sensing means enters the first fractionating cell, the stepping switch will be at contact "a." At that position a relay 21 is connected across the source of power. (For ease of representation, the various leads have not been shown connected to the stepping switch contacts, but are coded so that the circuit may be followed. For example, step contact "a" of bank S2 is identified by the code S2a, and it may be seen that the relay R21 is connected to that contact.) Energization of the relay R21 opens normally closed switch R21a, preventing energization of either relays R5 or R6 which are connected in parallel thereto or de-energizing either of them that may have been previously actuated. When timer T1 times out, the timer switch T1b will be closed and the stepping switch 142 will be moved to the next position (an even position) such as to contact "b." This de-energizes relay R21, thus reclosing switch R21a. The pH sensing means 48 is connected through the pH meter 50 to the controller 132. Also bank S5 of the stepping switch 142 connects the first set-point potentiometer generally 130 with the controller 132, and the latter may close one of the two control switches 134 and 136. A separate set-point potentiometer corresponds to each cell (only the first two are shown in FIGURE 4B) and each is adjusted to establish the desired reference level for the pH in the respective cell. If no adjustment in pH is necessary, neither of the control switches will be closed.

If the pH sensing means 48 and controller 132 indicate that an negative potential should be applied to the electrotitrating wire 46a (seen in FIGURE 4C), only switch 134 is closed, connecting bank S3 to the source of power. At the first cell, the stepping switch will now be in position "b" and relay R5 will be energized (through connection S3b). In turn, relay R5 closes three relay switches R5a, R5b, and R5c. Switch R5a provides a self-holding circuit to maintain the relay R5 energized until relay R21 is again energized to open switch R21a. Switches R5b and R5c close to provide a connection across an ammeter M1 to the electrotitrating wire 46a. A negative potential will, thus, be applied in the first cell when switch R4a is closed while the pH meters are in the rinse tank.

If a positive potential is required, the control switch 136 will be closed (and switch 134 left open), connecting the bank S4 to the source of power and applying energy to relay R6 (through contact S4b). Actuation of the latter relay closes four relay switches; namely, R6a, R6b, R6c, and R6d. Switch R6a provides a self-holding circuit to maintain the relay R6 energized. R6b and R6c close to provide a circuit across the ammeter M1 to the electrotitrating wire 46a from the source of positive potential when the switch R4b is closed during the time the pH meter is in the rinse tank.

Also, relay R6 closes switch R6d which connects a lamp L1 associated with the circuit to the first fractionating cell, across a source of power. Thus the lamp L will indicate that positive potential is applied to a given cell; whereas, a meter reading in the absence of a lighted lamp will indicate a negative potential.

It is to be noted that, due to either of the self-holding circuits through switches R5a or R6a, one or the other of the relays R5 and R6 will be continuously energized from the time that the first cell is scanned until the pH sensing means generally 48 completes its circuit of all other cells and is prepared to again scan the first cell. Only at the latter time will the stepping switch be in position "a" so that the relay R21 again will be energized to open switch R21a and break the circuit to either of the relays R5 or R6.

It will follow that the control circuits for each fractionating cell operate in substantially the same manner as that described for the first cell as the stepping switch 142 advances to each respective pair of contacts.

It will also be observed in FIGURE 4C that each circuit to the electrotitrating wires, such as wire 46a, contains an adjustable potentiometer, such as potentiometers P5 and P6 in the negative potential and positive potential circuits, respectively. The variable potentiometers are manually adjustable at the beginning of any operation to establish the desired adjustment potential level and provide the allowable current in the electrotitrating wire. Furthermore, during the course of operation on a given solution of amphoteric substances, it may become necessary to rebalance the system through further adjustment of the variable potentiometers. This is usually accomplished in accordance with the current flow indicated by meters M1 through M8.

Obviously, many modifications and variations of the invention as hereinbefore set forth may be made without departing from the spirit and scope thereof and, therefore, only those limitations should be imposed as are indicated in the appended claims.

I claim:

1. An improved apparatus for the electrophoretic fractionation of ampholytes, said apparatus comprising: a bank of a plurality of cells for containing a solution of ampholytic materials, said cells permitting migration of ampholytes therebetween; anode and cathode means at opposite ends of said cell bank; single electrode means positioned within each cell said anode, cathode, and electrode means being connectable to a source of direct electric current; rinsing means located proximate said bank of cells; a pH sensing means positioned to be insertable within said cells and said rinsing means; movable carriage means positioned adjacent said bank of cells and said rinsing means, said movable carriage means supporting said pH sensing means and operable to cyclically insert said pH sensing means in each cell and said rinsing means; and electrical control means connected to said pH sensing means, to regulate the relative potential of said current connected to said electrode means.

2. The apparatus of claim 1 wherein the control means is also adapted to disconnect said source of direct current from said anode and cathode and said electrodes during at least a portion of the time said pH sensing means is inserted in a cell.

3. An improved apparatus for the electrophoretic fractionation of ampholytes, said apparatus comprising: a bank of a plurality of cells for containing a solution of ampholytic materials, said cells permitting migration of ampholytes therebetween; an anode and a cathode positioned at opposite ends of the plurality of cells; a plurality of pH adjusting electrodes, one of said electrodes positioned in each cell, said anode, cathode, and electrodes being connectable to a source of D.C. potential having positive and negative sides; first relay switches connected between each said electrode and the negative side of said D.C. potential; second relay switches connected between each of said electrodes and the positive side of said D.C. potential in parallel to said first switch, both said first and second switches being normally open; first switching means adapted to sequentially connect the first relays to a source of electric power to close one of said first relay switches and place a negative potential on one of said electrodes; a second switching means adapted to sequentially connect the second relays to the source of electric power and close one of said second relay switches and place a positive potential on one of said electrodes; control means between said first and second switching means and the source of electric power, said control means adapted to connect not more than one of said first and second switching means to said source of electric power in accordance with the variation of the pH level in a given cell from a desirous pH level; a rinse tank spaced parallel to said cells; a pH sensing means connected to said control means, said sensing means adapted to be inserted into each cell and into said rinse tank; a track positioned between said rinse tank and said cells; a carriage slidingly supported on said track; a stop member adjacent said track opposite each cell; a limit switch mounted on said carriage for engaging each stop member; a pair of arms rotatably mounted on said carriage, said arms being positioned to be rotatable through an arc transverse of said carriage between said rinse tank and said cells, said arms being connected together to remain parallel throughout rotation and pivotally supporting said pH sensing means at the ends thereof; a reversible motor connected to drive at least one of said arms; a pair of trip switches mounted at each side of said carriage in the path of said arms, said switches being electrically connected to said reversible motor to stop the movement of said arms and reverse the motor at positions where the pH sensing means is inserted in a cell and said rinse tank; and a drive motor connected to said carriage for moving it along said track, said drive motor being electrically connected to said limit switch to stop said carriage at positions where the pH sensing means will be adjacent successive cells.

4. An improved apparatus for testing the pH of a solution in a plurality of serially arranged cells, said apparatus comprising: a rinse tank spaced parallel to said cells; movable means located between said rinse tank and the cells, said movable means being constrained to travel parallel to said cells and transversely between said cells and said rinse tank; drive means connected to said movable means, positioning means connected to stop said drive means when said movable means is adjacent a cell; and pH sensing means carried on said movable means, said pH sensing means being mounted for immersion thereby alternately in said rinse tank and said cell.

5. An improved apparatus for testing the pH of a solution in a plurality of serially arranged cells, said apparatus comprising: a rinse tank spaced parallel to said cells; carriage means located between said rinse tank and said cells, said carriage means being constrained to travel parallel to said cells, transversely movable means mounted on said carriage means for movement between positions above said rinse tank and above said cells; drive means connected to said carriage means; positioning means connected to stop said carriage means when said movable means is adjacent a cell; and pH sensing means carried on said transversely movable means, said pH sensing means being alternately inserted in a cell and in said rinse tank.

6. An improved apparatus for testing the pH of a solution in a plurality of serially arranged cells, said apparatus comprising: a rinse tank spaced parallel to said cells; a track positioned between said rinse tank and said cells; a carriage slidingly supported on said track; a stop member adjacent said track opposite each cell; a first switch mounted on said carriage for engaging each stop member; a pair of arms rotatably mounted on said carriage, said arms being positioned to be rotatable through an arc transverse of said carriage between said rinse tank and said cells, said arms being connected together to remain parallel throughout rotation; a reversible motor connected to drive at least one of said arms; a pair of trip switches mounted at each side of said carriage in the path of said arms, said switches being electrically connected to said reversible motor to stop the movement of said arms at positions above said rinse tank and said cells and to reverse said motor; a pH sensing means pivotally mounted between the outward ends of said arms; and a drive motor connected to said carriage for moving it along said track, said drive motor being electrically connected to said first switch to stop said carriage at positions where said arms will swing said pH sensing means into successive cells.

7. An improved electrical system for controlling the pH level of a plurality of fractionating cells wherein an ampholytic solution is undergoing electrophoretic fractionation, said system comprising: an anode and a cathode positioned at opposite ends of the plurality of cells; a plurality of pH adjusting electrodes, one of said electrodes positioned in each cell said anode, cathode, and electrodes being connectable to a source of D.C. potential having positive and negative sides; a pair of switches connected in parallel between each said electrode and said source of D.C. potential; a pH sensing means movably mounted to be inserted into each cell in sequence to measure the pH level therein; and control means connected to said pH sensing means, said control means being operable to close one of said pair of switches to the respective electrode where the pH level in a given cell varies from a desired pH value.

8. An improved electrical system for controlling the pH level of a plurality of fractionating cells wherein an ampholyte solution is undergoing electrophoretic fractionation, said system comprising: an anode and a cathode positioned at opposite ends of the plurality of cells; a plurality of pH adjusting electrodes, one of said electrodes positioned in each cell, said anode, cathode, and electrodes being connectable to a source of D.C. potential having positive and negative sides; first relay switches connected between each said electrode and the negative side of said D.C. potential; second relay switches connected between each said electrode and the positive side of said D.C. potential in parallel to said first switch, both said first and second switches being normally open; first switching means adapted to sequentially connect the first relays to a source of electric power to close one of said first relay switches and place a negative potential on one of said electrodes; second switching means adapted to sequentially connect the second relays to the source of electric power to close one of said second relay switches and place a positive potential on one of said electrodes; control means between said first and second switching means and the source of electric power, said control means operable to connect not more than one of said first and second switching means to said source of electric power in accordance with the variation of the pH level in a given cell from a desired pH value; and pH sensing means connected to said control means, said sensing means being movably mounted to be inserted into each cell in sequence and measure the pH level therein.

9. The electrical system of claim 8 wherein means is provided to disconnect said source of D.C. potential from said anode and cathode and said electrodes during at least a portion of the time said pH sensing means is inserted in a cell.

References Cited

UNITED STATES PATENTS

| | | | |
|---|---|---|---|
| 2,547,231 | 4/1951 | Sartakoff | 204—180 |
| 2,666,691 | 1/1954 | Robinson et al. | 23—253 |
| 2,770,531 | 11/1956 | Hawes | 23—230 |
| 2,898,200 | 8/1959 | Kan | 23—253 |
| 2,928,406 | 3/1960 | Conniff et al. | 137—5 |
| 2,928,782 | 3/1960 | Leisey | 204—231 |
| 2,989,377 | 6/1961 | Leisey | 23—253 |
| 3,038,844 | 6/1962 | Webb | 204—180 |
| 3,143,393 | 8/1964 | De Sequin des Hons | 23—253 |
| 3,240,692 | 3/1966 | Donnelly | 204—180 |

FOREIGN PATENTS

| | | |
|---|---|---|
| 1,237,774 | 6/1960 | France. |

JOHN H. MACK, *Primary Examiner.*

J. BATTIST, E. ZAGARELLA, *Assistant Examiners.*